No. 745,109. PATENTED NOV. 24, 1903.
G. LAFRENTZ.
STRAINER.
APPLICATION FILED JULY 9, 1903.
NO MODEL.

Witnesses
Geo. Ackman Jr.
Chas. S. Hoyer.

Inventor
Gertrude Lafrentz
By Victor J. Evans
Attorney

THE NORRIS PETERS CO., PHOTO-LITHO., WASHINGTON, D. C.

No. 745,109. Patented November 24, 1903.

UNITED STATES PATENT OFFICE.

GERTRUDE LAFRENTZ, OF CHICAGO, ILLINOIS.

STRAINER.

SPECIFICATION forming part of Letters Patent No. 745,109, dated November 24, 1903.

Application filed July 9, 1903. Serial No. 164,859. (No model.)

*To all whom it may concern:*

Be it known that I, GERTRUDE LAFRENTZ, a citizen of the United States, residing at Chicago, in the county of Cook and State of Illinois, have invented new and useful Improvements in Strainers, of which the following is a specification.

This invention relates to strainers or spouts for coffee-pots and the like; and the primary object of the same is to provide a removable device of this kind for application to the outlet extremity of a spout and having structural features which will cause it to conform in contour to and become secured in connection with when applied the upper edge of the spout and offer sufficient resistance to the pressure or force brought to bear thereon in pouring the contents of the coffee-pot through the spout as to obstruct any tendency toward loose movement or accidental disengagement.

With this and other objects and advantages in view the invention consists in the construction and arrangement of the several parts, which will be more fully hereinafter described and claimed.

Figure 1:
Figure 2:
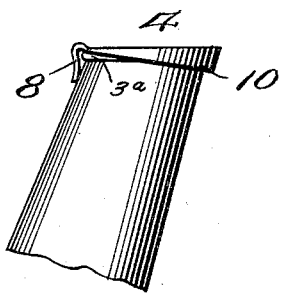
Figure 4:
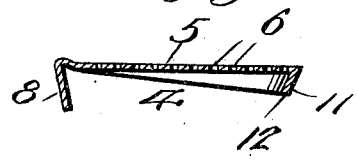
Figure 3:
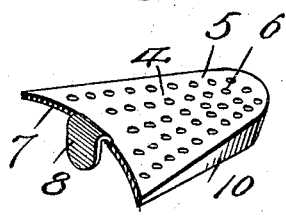

In the drawings, Figure 1 is a perspective view of a coffee or tea pot, showing the improved strainer applied to the spout thereof. Fig. 2 is a detail perspective view of the strainer detached. Fig. 3 is a longitudinal vertical section of the strainer. Fig. 4 is a side elevation of a spout of different form, showing the strainer applied thereto.

Similar numerals of reference are employed to indicate corresponding parts in the several views.

The numeral 1 designates the ordinary form of tea or coffee pot, having a hinged lid or cover 2 and an upwardly-extending pouring-spout 3, which flares toward its upper end, and has a bead 3ᵃ at its upper edge, as in ordinary spout constructions. The improved strainer 4 is constructed from a single piece of metal and is shaped to conform to the contour of the upper edge of the pouring-spout 3, and therefore converges toward its outer extremity. The top 5 of the strainer is flat and has a series of perforations 6 therein. The rear edge 7 of the strainer is of concave form to fit closely against the upper part of the body of the coffee or tea pot adjacent to the rear upper portion of the pouring-spout, and integrally formed with the center of said rear edge is a catch-tongue 8, which is bent downwardly to fit over the bead 9 around the top opening of the body of the coffee or tea pot. The tongue 8 will not interfere with the operation of the lid or cover 2, and the latter when closed will act as a means for firmly holding the tongue in applied position, as clearly shown by Fig. 1. Depending from the strainer at the sides and forward extremity is a flange 10, which gradually diverges from the rear edge toward the front to a maximum portion 11, which is inclined rearwardly, so that the under edge 12 of the flange at the front extremity of the strainer will be located under the adjacent portion of the top 5.

In Fig. 4 an elongated spout is shown, to which the strainer is applied to indicate that a particular form of spout is not essential in order to render the strainer practical, and in this instance the tongue 8 bears firmly against the inner portion of the spout.

In applying the strainer the front extremity is first caught over the bead at the upper end of the spout and then gradually brought downward to a horizontal position, and the tongue is inserted over the bead 9 at the top of the body or pressed against the inner upper portion of the spout, as shown by Fig. 4. The rearwardly-inclined maximum depending portion 11 of the flange constitutes a lock in connection with the bead at the top of the spout with which it engages. It will be observed that the maximum depending portion of the flange sets up the greatest resistance to accidental detachment or loosening of the strainer at a point where the greatest pressure of the liquid poured from the coffee or tea pot is applied, and hence the strainer will reliably perform its function of holding within the spout any dregs or sediment that may pass through the usual strainer in the body of the coffee or tea pot communicating with the spout. The strainer can be readily detached at any time by first disengaging the outer extremity thereof from the spout and then elevating the tongue 8 from the portion of the body or the spout on which it has had bearing. It will be understood that the strainer is to be formed of sheet metal struck into the form shown and is adapted to be suitably plated to give it an ornamental as well as cleanly appearance.

Changes in the proportions and dimensions may be resorted to without departing from the spirit of the invention.

Having thus fully described the invention, what is claimed as new is—

1. A strainer for application to the upper end of a spout, having a contour conforming to the said spout end and comprising a top perforated plate, a rear concave edge having a central downwardly-bent tongue, and a surrounding depending flange at the sides and forward extremity, the flange at the forward extremity having a maximum dependence and inclining in a rearward direction.

2. A strainer for a coffee-pot, consisting of a top plate with perforations therein having a rear depending catch-tongue and a surrounding flange at the sides and forward extremity, the said flange increasing in width toward the forward extremity where it has its maximum dependence and is inclined in a rearward direction.

3. A strainer, having a perforated top plate with a depending flange at the sides and front extremity, the flange at the front extremity being inclined rearwardly under the plate, and a depending tongue at the center of the rear edge of the plate.

In testimony whereof I affix my signature in presence of two witnesses.

GERTRUDE LAFRENTZ.

Witnesses:
ANNA ROBINSON,
CAROLIENE SIGMUND.